United States Patent
Clemm et al.

(10) Patent No.: US 10,110,451 B2
(45) Date of Patent: *Oct. 23, 2018

(54) CONTINUOUS AUTONOMOUS MONITORING OF SYSTEMS ALONG A PATH

(71) Applicant: Cisco Technology, Inc., San Jose, CA (US)

(72) Inventors: Alexander Clemm, Los Gatos, CA (US); Yuquan Jiang, Fremont, CA (US); Steve Chang, Cupertino, CA (US); Shyyunn Lin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/365,778

(22) Filed: Nov. 30, 2016

(65) Prior Publication Data

US 2017/0085451 A1 Mar. 23, 2017

Related U.S. Application Data

(63) Continuation of application No. 14/480,506, filed on Sep. 8, 2014, now Pat. No. 9,565,082, which is a (Continued)

(51) Int. Cl.
*G06F 15/173* (2006.01)
*H04L 12/26* (2006.01)

(52) U.S. Cl.
CPC .............. *H04L 43/08* (2013.01); *H04L 43/02* (2013.01); *H04L 43/04* (2013.01); *H04L 43/06* (2013.01); *H04L 43/12* (2013.01)

(58) Field of Classification Search
CPC ................................ H04L 43/08; H04L 43/12
See application file for complete search history.

(56) References Cited

U.S. PATENT DOCUMENTS 6,954,779 B2 10/2005 Duggan et al.
7,646,728 B2 1/2010 Fahmy
(Continued)

FOREIGN PATENT DOCUMENTS

CN 1511399 A 7/2004
CN 1794662 A 6/2006
(Continued)

OTHER PUBLICATIONS

Takacs A. et al., GMPLS RSVP-TE Extensions to Control Ethernet OAM draft-takacsccamp-rsvp-te-eth-oam-ext-01, Dated Feb. 25, 2008, 23 pages.

(Continued)

*Primary Examiner* — Jason D Recek
(74) *Attorney, Agent, or Firm* — Hickman Palermo Becker Bingham LLP (57) ABSTRACT

In an embodiment, a method comprises initiating a monitoring session for a communication path including creating and storing monitoring session state data; sending, to a first responder computer of the communication path, a first request to initiate a first state servlet that is configured to monitor continuously during the monitoring session one or more characteristics of one or more processes that the first responder computer may perform; sending, to the first responder computer, monitoring instructions to monitor the one or more characteristics of the one or more processes; while the monitoring session is active and the first responder computer is in the communication path, receiving and collecting monitored information from the first responder computer; in response to determining that the first responder computer is not in the communication path or that the monitoring session has become inactive, automatically and autonomously ending the monitoring session.

18 Claims, 4 Drawing Sheets

Related U.S. Application Data continuation of application No. 12/837,335, filed on Jul. 15, 2010, now Pat. No. 8,838,781.

(56) References Cited

U.S. PATENT DOCUMENTS

| | | |
|---|---|---|
| 2001/0038611 A1 | 11/2001 | Darcie et al. |
| 2002/0169860 A1 | 11/2002 | Duggan |
| 2004/0073653 A1 | 4/2004 | Hunt et al. |
| 2005/0256669 A1 | 11/2005 | Mitsui |
| 2006/0271677 A1* | 11/2006 | Mercier ............ G06F 17/30197 709/224 |
| 2006/0294230 A1 | 12/2006 | Takasu |
| 2009/0019432 A1 | 1/2009 | Kondo |
| 2009/0164613 A1 | 6/2009 | Saillet |
| 2010/0014439 A1 | 1/2010 | Fuhrrnann et al. |
| 2010/0260054 A1 | 10/2010 | Habib et al. |
| 2010/0262367 A1* | 10/2010 | Riggins ................. G06Q 10/10 701/533 |
| 2011/0063972 A1* | 3/2011 | Muley ................. H04L 12/1877 370/225 |
| 2012/0008498 A1 | 1/2012 | Clemm |
| 2015/0006721 A1 | 1/2015 | Clemm et al. |

FOREIGN PATENT DOCUMENTS

| | | |
|---|---|---|
| CN | 101047575 A | 10/2007 |
| EP | 1 675 303 A1 | 6/2006 |
| EP | 2 159 956 A1 | 3/2010 |
| WO | WO 2009/01643 A1 | 2/2009 |

OTHER PUBLICATIONS

Subramanyan. et al, A Scalable SNMP-Based Distributed Monitoring System for Heterogeneous Network Computing, ACM New York, 2000, 10 pages.

State Intellectual Property Office of the People's Republic of China, "First Office Action" in application No. 201080068045.2, dated Jul. 23, 2014, 8 pages.

State Intellectual Property Office of the People's Republic of China, 1st Office Action in application No. 201010611936.X, dated Jul. 10, 2013, 17 pages.

Leung Y-W et al., Lower Bound for Multimedia Multicast Routing, IEE Proceedings: Communications, Institution of Electrical Engineers., vol. 145, No. 2, Dated Apr. 16, 1998, pp. 87-90.

Kamil Sarac et al.,A Distributed Approach for Monitoring Multicast Service Availability, Journal of Network and Systems Management, vol. 12, No. 3, Dated Sep. 1, 2004 pp. 327-348.

International Searching Authority, International Search Report with Written Opinion PCT application No. PCT/US2010/054349 dated Mar. 2, 2011, 13 pages.

European Patent Office, Search Report with Written Opinion, Application No. 10196975.6 - 2416 dated Jul. 11, 2011, Applicant: Cisco Systems Inc., 8 pages.

Current Claims in application No. 201010611936.X, dated Jul. 2013, 4 pages.

Current Claims in Application No. 10196975.6 2416, Applicant: Cisco Systems Inc., 3 pages, dated Jul. 2011.

Current claims for PCT application No. PCT/iJS2010/054349, dated Mar. 2011.

Claims in China Application No. 201080068045.2, dated Jul. 2014, 6 pages.

* cited by examiner

FIG. 4

CONTINUOUS AUTONOMOUS MONITORING OF SYSTEMS ALONG A PATH

BENEFIT CLAIM

This application claims benefit under 35 U.S.C. § 120 as a Continuation of application Ser. No. 14/480,506, filed Sep. 8, 2014 which is a continuation of issued U.S. Pat. No. 8,838,781 B2 issued on Sep. 16, 2014, the entire contents of which are hereby incorporated by reference as if fully set forth herein. The applicants hereby rescind any disclaimer of claim scope in the parent application or the prosecution history thereof and advise the USPTO that the claims in this application may be broader than any claim in the parent application.

TECHNICAL FIELD

The present disclosure generally relates to communications between systems in distributed network infrastructure and allows system monitoring along communication paths.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Certain network service assurance tasks require continuous monitoring of the systems that are used to deliver an end-to-end networking service. For example, interactive video requires monitoring end-to-end service levels and statistics at various systems along communication paths to determine whether any service bottlenecks exist. A bottleneck may occur when, for example, one or more links along the communication path is excessively utilized.

Another example of such service tasks involves path monitoring to determine potential trouble spots, which could include one or more systems along the communication path that cause a high loss of packets as video data is transmitted. A network administrator can monitor interactive video and path monitoring by configuring monitoring functions on routers and switches and observing result data.

While monitoring a video stream can be useful, monitoring communication paths is CPU-intensive, and hence should be performed sparingly. In fact, due to the large amount of CPU resources required, usually only a small fraction of video flows can be monitored. Most often, video monitoring along certain communication paths is disabled by network administrators. Alternatively, video monitoring might be turned on only when needed, but monitoring data will be available and capable of retrieval only for those video flows for which monitoring was turned on earlier.

Continuous monitoring of communication paths, and each of the systems along the paths, may involve considerable effort and is usually performed inefficiently. For instance, monitoring typically involves configuring monitoring functions on more systems than necessary, and provides more information than required.

Moreover, once set up, monitoring of the paths is usually kept in place much longer than necessary. As a result, effectiveness of service assurance activities is limited and may cause considerable waste of management bandwidth and CPU cycles because a great deal of the collected data is never used.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Structural and Functional Overview |
| 3.0 | Process of initiating a monitoring session |
| 4.0 | Process of monitoring events |
| 5.0 | Implementation Mechanisms-Hardware Overview |
| 6.0 | Extensions and Alternatives |
| 7.0 | Additional Disclosure |

1.0 General Overview

In an embodiment, a method is performed by one or more processors, comprising an initiator computer, and comprises initiating a monitoring session for a communication path including creating and storing monitoring session state data; sending, to a first responder computer of the communication path, a first request to initiate a first state servlet that is configured to monitor continuously during the monitoring session one or more characteristics of one or more processes that the first responder computer may perform; sending, to the first responder computer, monitoring instructions to monitor the one or more characteristics of the one or more processes; while the monitoring session is active and the first responder computer is in the communication path, receiving and collecting monitored information from the first responder computer; in response to determining that the first responder computer is not in the communication path or that the monitoring session has become inactive, automatically and autonomously ending the monitoring session and deleting the monitoring session state data without sending further instructions to the first responder computer.

In an embodiment, a computer-readable storage medium stores one or more sequences of instructions which, when executed by one or more processors, cause the one or more processors to perform the steps of the method described above.

2.0 Structural and Functional Overview

Figure 1:
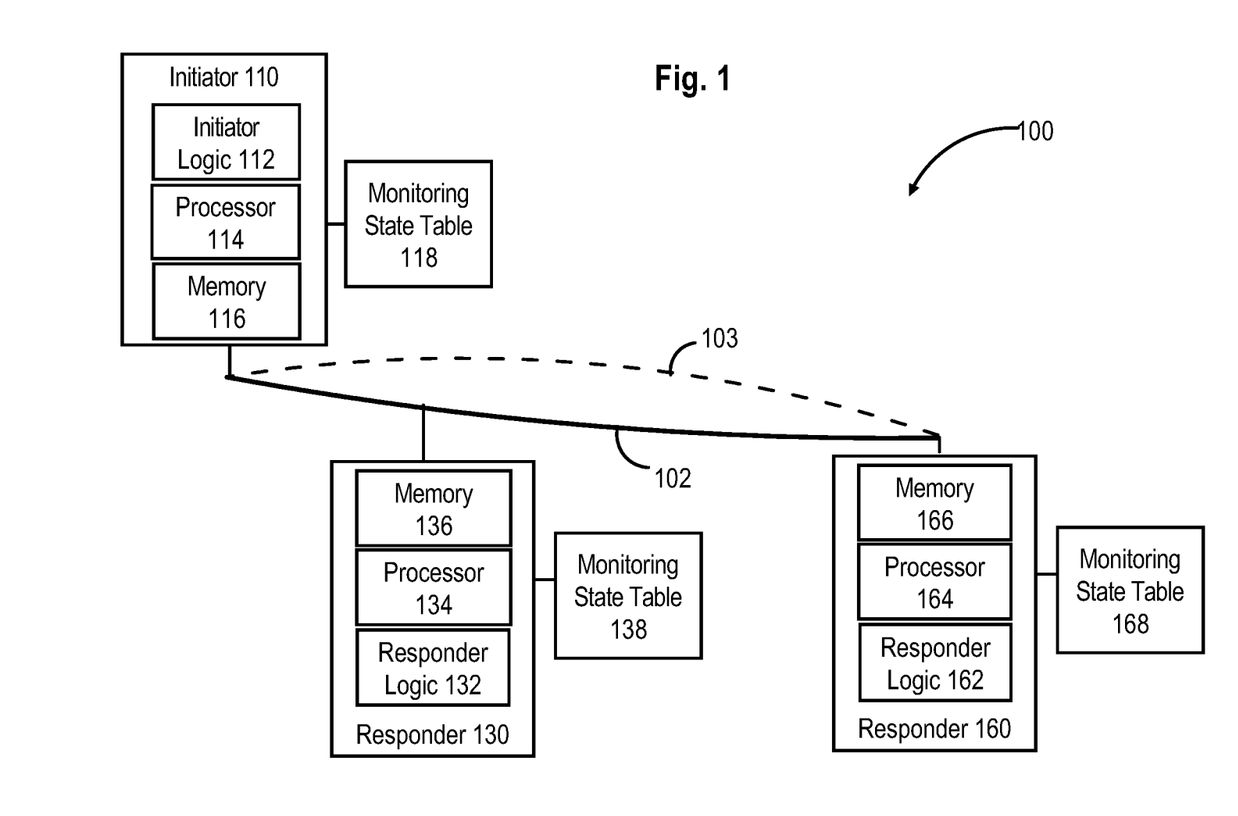
FIG. 1 illustrates an embodiment of a communications path supporting a continuous monitoring session.
Figure 2:
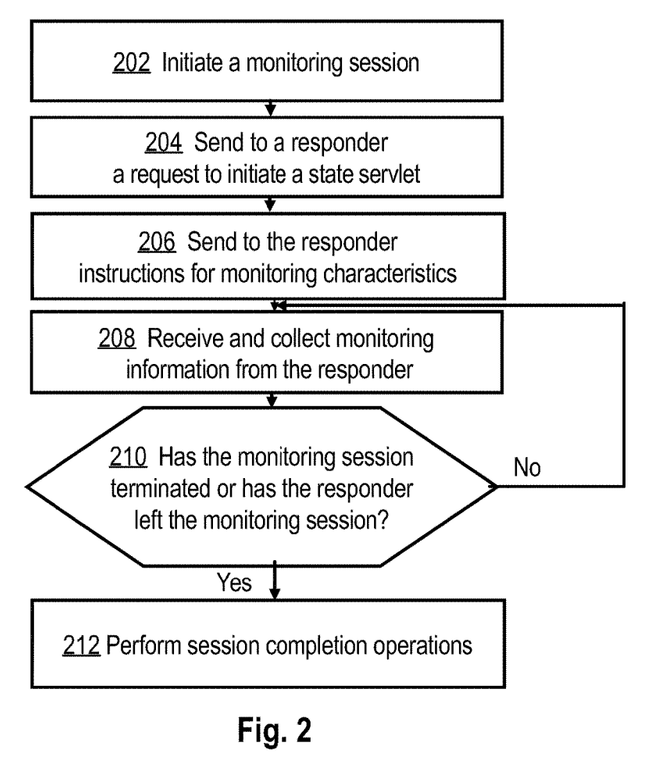
FIG. 2 illustrates an embodiment of a process executed by a monitoring session initiator.
Figure 3:
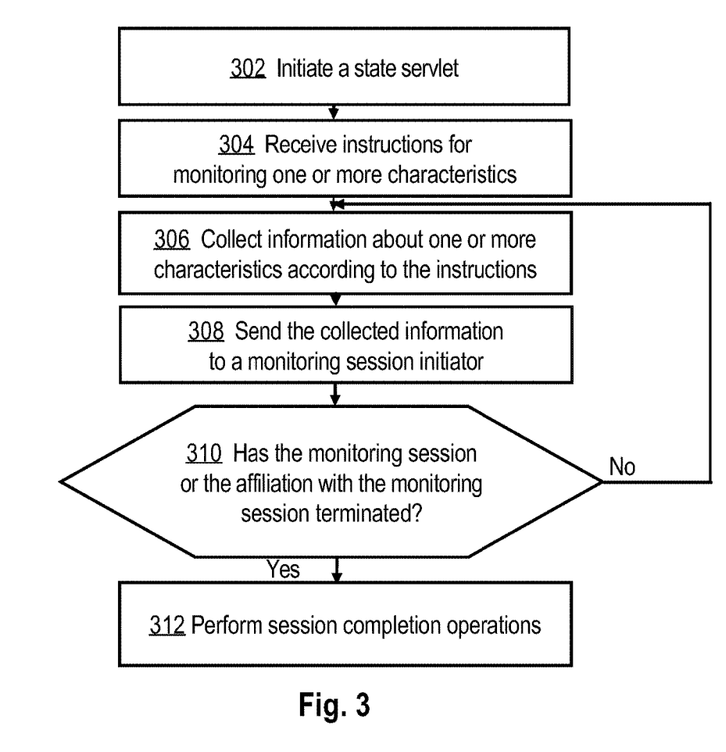
FIG. 3 illustrates an embodiment of a process executed by a monitoring session responder.
Figure 4:
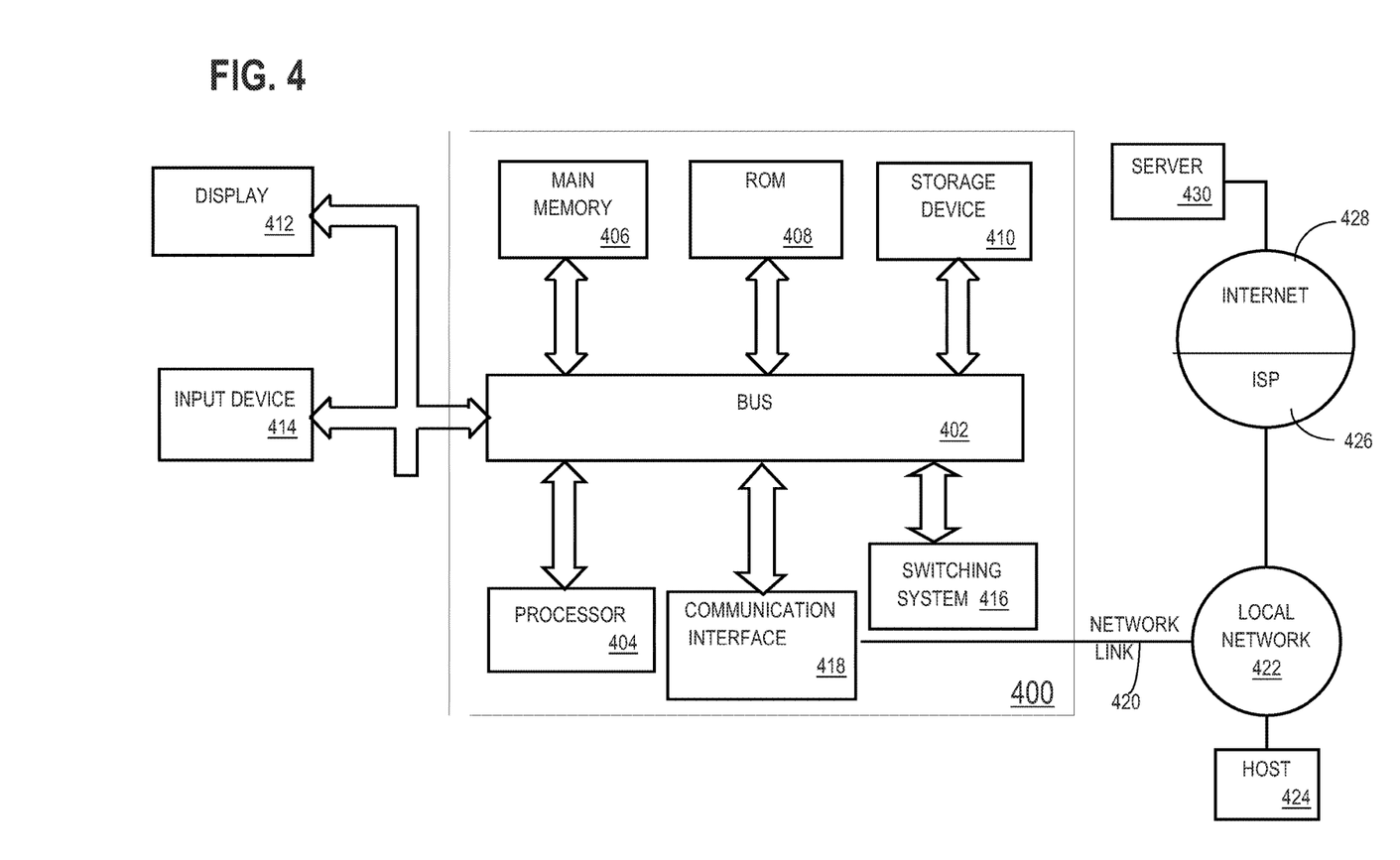
FIG. 4 illustrates a computer system upon which an embodiment may be implemented.

FIG. 1 illustrates an embodiment of a communications path supporting a continuous monitoring session; FIG. 2 illustrates an embodiment of a process executed by a monitoring session initiator; FIG. 3 illustrates an embodiment of a process executed by a monitoring session responder; FIG. 4 illustrates a computer system upon which an embodiment may be implemented. Referring first to FIG. 1, in an embodiment, a computer system 100 comprises one or more monitoring session initiators 110 and one or more monitoring session responders 130, 160. Each of the monitoring session initiators and monitoring session responders may be implemented in a computer such as a special-purpose computer or general purpose computer, and may use hardware logic such as in an application-specific integrated circuit (ASIC), field-programmable gate array (FPGA), system-on-a-chip (SoC) or other combinations of hardware, firmware and/or software.

Computer system 100 may be a network of inter-connected network of computers, such as a corporate intranet or the Internet. The computers within the system 100 communicate with each other via communication paths. Communication paths may be created through the network to allow a computer on one end of a path to communicate with a computer on another end of the path.

Various network management protocols may be used to manage network communication paths and allocate resources for communications between computers in various embodiments. For example, ICMP traceroute may be used to discover the IP addresses of interfaces of the systems located along a network path. Multiprotocol Label Switching (MPLS) and Administration and Maintenance (OAM, MPLS-OAM) may be used to establish an MPLS label switched path (LSP) and to manage MPLS labels used to transmit packets along a path. Ethernet OAM (E-OAM) or other similar protocol may be used to manage data transmission for Ethernet domains. Cisco Discovery Protocol (CDP) and Link Layer Discovery Protocol (LLDP) may be used to allow a device to collect information about physically connected neighbors. Resource Reservation Protocol (RSVP) may be used to transmit messages along a path for a special-purpose application that is concerned with reservation of resources for quality of service (QoS) purposes. These and similar protocols provide network control and management for performing network management tasks, such as network discovery, path creation, path management or network resource management.

Embodiments may utilize path-oriented network control protocols to transport system management requests and system management request response payloads to nodes along a network path. For example, RSVP may be extended to distribute system management requests and response payloads.

RSVP is a transport layer protocol to reserve resources at a node located along a path between an originating node and a destination node across a network. An RSVP Path message may be sent from an originating node to a destination node to reserve resources for a data flow at intermediate nodes along the network path. Once the RSVP Path message reaches the destination node, the destination node may transmit an RSVP RESV message along the network path back to the originating node.

The RSVP RESV message may indicate to a node located along a network path the resources that are needed for transmitting a data flow along the path. In an embodiment, RSVP includes system management requests and system management request response payloads. Embodiments provide for sending a single RSVP message that comprises a system management request and that is received by multiple nodes along a network path, thereby reducing traffic on the network.

Alternative embodiments may use other protocols used to transport system management requests and system management response payloads and RSVP is not required. For example, some embodiments may use STUN or NLS messages.

In an embodiment, monitoring session initiator 110 and monitoring session responders 130, 160 may host one or more agents that implement network management protocols and are configured to perform In-Service Software Upgrade (ISSU), logic to implement various communication protocols, such as MACsec, IEEE 802.1X-REV, MACsec key agreement (MKA) IKE, IPsec, TrustSec, simple network management protocol (SNMP), and other protocols.

In certain embodiments, monitoring session initiator 110 and monitoring session responders 130, 160 comprise networking infrastructure elements such as a router, switch, firewall or gateway. Examples of monitoring session initiators 110 and monitoring session responders 130, 160 include general-purpose computers hosting or executing data communication software, routers, distributed switches such as Cisco Nexus 7000 series or Cisco Catalyst 4500 series switches from Cisco Systems, Inc., San Jose, Calif. The monitoring session initiator and monitoring session responder may be part of the Medianet solution from Cisco Systems, Inc., San Jose, Calif.

In an embodiment, monitoring session initiator 110 and one or more monitoring session responders 130, 160 communicate with each other via communications links 102, 103. The communications links may be unidirectional or bidirectional. The communication links may be implemented using any of several technologies such as wireless, Ethernet, ATM, and optical links. In an embodiment, computer system 100 is an IEEE 801 compliant network and comprises a topology of any number of point-to-point links, LANs, and/or MANs.

For purposes of illustrating clear examples, FIG. 1 shows one monitoring session initiator 110 and two monitoring session responders 130, 160. However, practical embodiments may use any number of network computers 110, 130.

Monitoring session initiator 110 comprises, in various embodiments, initiator logic 112, one or more processors 114, one or more memory units 116, and one or more data storage devices storing various data structures including one or more instances of monitoring state table 118.

For simplicity and for purposes of illustrating clear examples, FIG. 1 shows one instance of initiator logic 112, one instance of processor 114, one instance of memory 116, and one instance of monitoring state table 118. However, practical embodiments may use any number of instances of initiator logic 112, any number of instances of processor 114, any number of instances of memory 120, and any number of instances of monitoring state table 118.

Monitoring session responder 130 comprises, in various embodiments, responder logic 132, 162, one or more processors 134, 164, one or more memory units 136, 166, and one or more data storage devices storing various data structures including one or more instances of monitoring state table 138.

For simplicity and for purposes of illustrating clear examples, FIG. 1 shows one instance of responder logic 132 (162, respectively), one instance of processor 134, 164 and one instance of memory 136, 166 and one instance of monitoring state table 138 (168). However, practical embodiments may use any number of instances of responder logic 132, 162, any number of instances of processor 134, 164, any number of instances of memory 136, 166, and any number of instances of monitoring state table 138 (168).

An embodiment allows setting up a continuous monitoring session among all systems that are located along a monitoring session path. "Continuous," in this context, means that network node monitoring can occur during the entire duration of a communication session. For example, with the techniques herein, a video transmission involving multiple network nodes in a path can be continuously monitored at all the network nodes in the path without the problems of past approaches.

An embodiment allows for continuous monitoring for systems located along the monitoring session path in an efficient manner. For example, the continuous monitoring requires that only the necessary resources are monitored for a specified period of time. Setting up the session may involve setting up a monitoring state to be in effect for the duration of the session. Upon the termination of the session, the state may be removed and the resources allocated for the session may be released. By applying certain configurations to the systems located along the monitoring session path, the systems are involved in the monitoring only for the duration of the monitoring session and during the time in which the system remains located along the monitoring path. When the system becomes excluded from the monitoring session, autonomous session completion operations are applied without involving the monitoring session initiator in the process.

In an embodiment, sessions may monitor systems along a media session, for example, by turning on passive video monitoring along each of the systems along the flow, periodically retrieving this information, and turning off the video monitoring when the video transmission is done.

3.0. Process of Initiating a Monitoring Session

FIG. 2 illustrates an embodiment of a process executed by a monitoring session initiator. In step 202, monitoring session initiator 110 initiates a monitoring session. In some embodiments a monitoring session is termed a Continuous Monitoring Session (CMS) and is a monitoring session established for a data communication path.

In one embodiment, monitoring session initiator 110 is responsible for issuing commands that will set up a monitoring state in the individual systems for monitoring, collecting and storing in the monitoring state table 118 monitoring data, statistics and other operational data relevant to the communication session.

Monitoring session initiator 110 may also maintain path information and path maps about the systems involved in communicating data along the path. For example, monitoring session initiator 110 may be responsible for discovering the systems located along the session path and for processing any route changes taking place along the path.

Requests to establish a CMS depend on a state that may be installed on a node that is located on the path and the type of data that the node may monitor. For example, the request to establish a CMS may be a request to retrieve video monitoring statistics that requires collecting information in a passive fashion when a video transmission starts and ends when the transmission of the video ends.

In an embodiment, a request to establish a CMS may include information on how to install the state. For example, the request may contain values of certain parameters and settings. For example, if a request reaches a node system that due to a path change is new to the path and that has not installed the state yet, the node system may be requested to apply the received transient configuration parameters to establish the CMS. In one particular embodiment, IAMP and RSVP are used for transport and message communication. In this case the retrieval requests traverse the path and if the path has changed, new nodes may be automatically discovered and have monitoring turned on as the path is traversed, and new nodes did not have monitoring turned on earlier will see the request. In another embodiment, the path is discovered from the initiator or requesting system, independent of the request traversal; new nodes may be specifically addressed or targeted by the initiator or requestor to turn on monitoring capability.

In an embodiment, a request to establish a CMS and the configuration parameters are sent in separate communications or separate messages. Alternatively, the request and the configuration parameters are sent in the same communication or message. For example, a "turn on" configuration parameter may be carried along with a primary request to establish the CMS.

In an embodiment, to start a CMS, a monitoring session initiator discovers the computer nodes located along a session communication path. When leveraging a path-oriented management communication mechanism, the session path may be discovered by issuing a request to the systems along the session path as identified by and collecting responses from the systems that received the requests.

In an embodiment, discovering the nodes on the session path may be performed as an independent step performed by the monitoring session initiator. In some implementations, the nodes may be discovered in response to a command or request issued at the monitoring session initiator. In an embodiment, a path could be discovered through an IP traceroute, or by analyzing a sequence of flow caches.

Alternatively, discovering nodes on the session path may be combined with a first action to be performed by a node on the monitoring path. For example, a request to discover the nodes may be combined with a request to set up a CMS, or with a request to turn on monitoring of service statistics associated with a particular video flow.

In step 204, monitoring session initiator 110 sends to a monitoring session responder a request to initiate a state servlet. In an embodiment, monitoring session initiator initiates, or causes to be initiated, a state servlet in monitoring session responders in each of the systems present on the communication path.

The state servlet acts as an agent that is responsible for monitoring and collecting various types of information in the system and sending the information to the monitoring session initiator. The information collected and sent to the monitoring session initiator is considered part of the CMS state.

In an embodiment, a servlet maintains certain state about the CMS that includes various types of information. For example, the servlet may maintain information about the type of monitoring that has been activated, the characteristics of the configuration and requests that are active within the session, or information about the last communication that was received within the session.

In an embodiment, monitoring session responders are systems that are present along a communication session path, and respond to the requests issued from the monitoring session imitators. A monitoring session responder includes a software-hardware component, referred to as a servlet, which maintains a local state that is specific to the continuous monitoring session.

In an embodiment, the servlet is responsible for servicing the requests received from a monitoring session initiator by carrying out the requested actions and installing the associated state.

In step 206, monitoring session initiator 110 sends to the responder instructions for monitoring characteristics. Once the CMS is established, a monitoring session initiator may send additional requests to the nodes that are part of the session path and on which servlets are initiated. For example, the monitoring session initiator may periodically retrieve monitoring statistics from the nodes that are part of the session path, or request that the statistics be collected and send to the monitoring session initiator by the monitoring session responders.

The monitoring instructions may provide information about monitoring frequency, the types of monitoring characteristics that should be sent to the monitoring session initiator, the level of detail of the monitoring reports that should be sent to the monitoring session initiator, or the type of parameters that should be sent to the monitoring session initiator.

In an embodiment, monitoring session initiator 110 sends instructions that are specific to a particular monitoring session responder. Hence, the instructions sent to one monitoring session responder may be different from the instructions sent to another monitoring session responder. For example, the instructions sent to endpoint nodes of the monitoring path may be different from the instructions sent to intermediate nodes of the monitoring path. The instructions for the endpoint nodes may require that the endpoints collect and send to the monitoring session initiator information about the type of requests and data that were sent from a starting point to an end point of the monitoring session, while the instructions for the intermediate nodes may comprise instructions for collecting and sending to the monitoring session initiator information about a data transmission success ratio for the incoming packets, a data retransmission ratio, or a number of undelivered packets.

4.0 Process of Monitoring Events

The approach for event monitoring is based on setting up continuous sessions for monitoring events by the systems that are located along the monitoring session. The continuous character of the monitoring sessions allows performing the monitoring on a continuous basis, as opposed to performing monitoring as a one-time event.

In an embodiment, continuous session monitoring involves installing state data at each of the systems that is located along the monitoring session path. The state remains in effect for the duration of the session, and that may be autonomously torn down (with or without further instructions) when it is no longer needed. For example, such state could entail ensuring that passive video monitoring is enabled and statistics are collected while the session is in progress and not when the session is terminated.

Monitoring of the session may involve monitoring various conditions, parameters and changes taking place in the systems that are located along the monitoring session path. For example, the configuration to perform the monitoring may be applied when a system joins a monitoring session, when the system that is already on the path leaves the path, when the session is originally initiated or when the system joins the path in the event of a route change. Each system maintains a local view of the session and performs any required session completion operations, such as stopping passive video monitoring, stopping communicating local route changes as applicable, releasing resources allocated for the monitoring, etc. The session completion operations may be performed autonomously when the session ends or when the system is no longer on the session monitoring path.

Referring again to FIG. 2, in step 208, monitoring session initiator 110 receives and collects monitoring information from a responder. The collected monitoring information is stored in one or more instances of monitoring state tables communicatively coupled with the monitoring session initiator. Monitoring information may include a variety of information related to the monitoring session, such as packet transmission monitoring data, data transmission statistics and an operational status of the monitoring session responder.

In step 210, the monitoring session determines whether the monitoring session has terminated or whether any of the responders left the monitoring session. The monitoring session may be terminated due to deactivation of the processes that were involved in the session, completion of the session, abort of the session, failure of the communication path, or administrative action. Upon termination of the monitoring session, the monitoring session initiator and the monitoring session responders may perform session completion operations described below.

Termination of the monitoring session may be detected in several ways in various embodiments. According to one approach, the state servlet may determine that session completion operations should be executed when a monitoring session initiator sends a message to indicate to the monitoring session responder that the monitoring session has ended. In an embodiment, in response to the message, the systems to execute the session completion operations and release the resources that were associated with the CMS.

Alternatively, the state servlet may determine that the session completion operations should be executed because the CMS timed-out at the state servlet. A CMS may time-out when no communications have been received from the monitoring session initiator for a specified period that may be established during CMS setup. This alternative allows ensuring that the monitoring resources are eventually released. For example, if the monitoring session responder does not receive session related communications, the monitoring session responder may assume that the session has ended or that the monitoring session responder became excluded from the monitoring session or monitoring path due to a route change or other factors.

In an embodiment, a session path may be redirected, changed or modified. The route changes may effect the monitoring session and the monitoring session path. For example, the route changes as new systems join the monitoring session path and old systems leave the path. The route changes may be automatically detected and communicated to a monitoring session initiator. Makeup of the systems that are part of the session can dynamically change and depends on the monitoring session path that is current at any given moment.

Information about route changes may be automatically determined by a monitoring session initiator when the initiator sends a subsequent request to the nodes along the monitoring path. For example, if the primary monitoring session has been changed, and nodes were added while other nodes were removed from the path, the nodes that were added should receive the request from the monitoring session initiator, while the nodes that were excluded from the monitoring session should not receive the request. In one embodiment, route changes may be detected automatically as the path is traversed when IAMP and RSVP are in place.

Alternatively, a route change notification may be emitted from neighbor nodes on the path that determine that the next hop or previous hop of a media session has changed; such a notification could trigger a request to re-initiate video monitoring.

In an embodiment, a new node that became part of the monitoring session due to a change in the monitoring session receives a request to initiate a state servlet and instructions from the monitoring session initiator. The state servlet starts communicating with the monitoring session initiator and thus provides indication to the monitoring session initiator that the new node has been effectively added to the monitoring session.

In an embodiment, the monitoring session initiator monitors the systems that are added to the monitoring session and those that are excluded from the monitoring session. The monitoring session initiator keeps track of the node systems that started providing responses to the monitoring session initiator and of the node systems that stopped providing responses to the monitoring session initiator. Thus, the monitoring session initiator may maintain a path map of the systems that are currently part of the monitoring session.

In an embodiment, the monitoring session initiator detects transient route changes effected to the monitoring session and distributes route change notifications and sends notifications to the current monitoring session responders that are located along the monitoring session path. Upon receiving a notification, a monitoring session responder analyzes the notification and makes a record of the changes to the route.

In an embodiment, local route change notifications that are detected at a monitoring session responder may also be communicated back to a monitoring session initiator. The monitoring session responder may send a notification by the underlying transport if the network supports a transport communication protocol, by a message sent by the state servlet, or any other notification that the monitoring session initiator can accept.

In an embodiment, upon a route change, a monitoring session imitator sends a refresh command and communicates a new CMS that needs to be installed as part of the monitoring session. The new state may comprise a request and actions that are associated with the refreshed monitoring session and that the monitoring session responder should perform as part of the monitoring. The refresh command may be ignored by the state servlets that are already part of the monitoring CMS.

However, the new nodes that have not yet installed the state servlet use the refresh command to establish communication with the monitoring session initiator and to communicate the requested information to the monitoring session initiator. The systems which are new to the path respond to the monitoring session initiator and thus provide information to the monitoring session initiator for updating the path map maintained by the monitoring session initiator. Alternatively, the monitoring session initiator may periodically rediscover the monitoring path and send requests to establish the session state directly to the new systems directly.

Referring again to FIG. 1, a primary path 102 connects initiator 110 with a responder 130 and a responder 160. For purposes of illustrating an example, assume that after the session was modified or altered, the primary path was modified as modified path 103 to include only monitoring session initiator 110 and monitoring session responder 130, while monitoring session responder 160 was excluded from the monitoring session path. Responder 130 became excluded from the session when the responder 130 received an indication or determined on its own that it was excluded from the session. Subsequently, the responder 130 performs session completion operations as further described herein.

In an embodiment, one or more nodes along a primary or modified path provide information to a monitoring session initiator 110 about the changes to the session and the changes to the session path. A servlet of a node may assume a role of an informant which informs a monitoring session initiator of any path changes.

Referring to FIG. 2, if in step 210 the monitoring session initiator determined that the monitoring session has not ended and that the monitoring session responder has not left the monitoring session, then the monitoring session initiator proceeds to step 208 and continues receiving and collecting monitoring information from the monitoring session responder.

However, if in step 210 the monitoring session initiator determined that the monitoring session has ended or that the monitoring session responder has left the monitoring session, then the process proceeds to step 212 in which session completion operations are performed, typically by the servlet on a responder. Depending on the applicable policy or configuration of the monitoring session, the servlet on a responder may be responsible for performing various session completion operations. Such operations may include releasing resources that were dedicated to the monitoring session. For example, the session completion operations may include de-allocating memory space that was previously utilized by the processes which now became inactive. The session completion operations may also include deactivating the processes which have not been called due to the session inactivity over a prolonged period of time.

In an embodiment, a servlet comprises instructions for performing session completion operation. For example, the servlet comprises instructions for removing the monitoring session and the monitoring state after the monitoring session has ended. The session completion operations may include instructions for turning off video monitoring, turning off other types of monitoring, or releasing resourced dedicated to the monitoring. Furthermore, session completion operations may include instructions and commands that may be applied to undo the changes performed as part of the monitoring session.

The monitoring session completion operations may be indicated by the instructions sent from a monitoring session initiator. Alternatively, the instructions may be hard-coded with the particular type of CMS. For example, completion operations for a video monitoring session may involve turning off video monitoring functions or otherwise re-configuring a node to discontinue video monitoring. In other embodiments, the session completion operations may be associated or sent with a particular request, including an independent request in combination with a request to initiate a monitoring state.

In an embodiment, the session completion operations and actions may be applied autonomously by a state servlet, without requiring further interaction with an external system, or a monitoring session initiator. For example, the state servlet may determine that the monitoring session CMS has ended and thus completion operations for the monitoring session.

In an embodiment, the session monitoring may be performed in the systems which frequently encounter route changes, as well as in systems in which the route changes are rare. Regardless of whether the changes are frequent or rare, the paths may be subjected to dynamic load balancing and subjected to changes that are transient.

FIG. 3 illustrates an embodiment of a process executed by a monitoring session responder. In step 302, the monitoring session responder receives a request from a monitoring session initiator to initiate a state servlet. The state servlet is responsible for monitoring and collecting various types of information in the system and sending the information to the monitoring session initiator. The collected monitoring information is stored in monitoring state table communicatively coupled with the monitoring session responder. The information collected and sent to the monitoring session initiator is considered part of the CMS state.

The state servlet allows the monitoring session responder to communicate with the monitoring session initiator and participate in collection and distribution of monitoring data and statistics.

In an embodiment, the monitoring session responder participates in the CMS established between a monitoring session endpoints. The responder may be any node located along the monitoring session path of the CMS.

Upon receiving the request to initiate a state servlet, the monitoring session responder installs or initiates the servlet parameters and enables the monitoring of the session parameters.

In step 304, the monitoring session responder receives instructions for monitoring one or more characteristics of the monitoring session CMS. In various embodiments the instructions for monitoring may provide information about monitoring frequency, the types of monitoring characteristics that should be sent to the monitoring session initiator, the level of detail of the monitoring reports that should be sent to the monitoring session initiator, or the type of parameters whose values should be sent to the monitoring session initiator.

In step 306, the monitoring session responder collects information about one or more characteristics according to the instructions received from the monitoring session initiator. Monitoring information in various embodiments may include a variety of information related to the monitoring session, such as data transmission monitoring data, data transmission statistics and an operational status of a monitoring node. For example, the monitoring session responder may collect information about various conditions, parameters and changes taking place in the monitoring session responder as the data is transmitted via the monitoring session responder. The collected information may include quality of service statistics, data transmission statistics, CPU usage, or memory usage.

In step 310, the monitoring session responder determines whether the monitoring session has terminated and the affiliation of the monitoring session responder with the session has terminated. The monitoring session may be terminated due to deactivation of the processes that were involved in the session, completion of the session itself, abort of the session, failure of the communication path, or administrative action. The affiliation of the monitoring session responder with the monitoring session may be due to rerouting of the session path, path component failure, or any other path change that effectively excluded the monitoring session responder from the monitoring session path.

If in step 310 the monitoring session responder determined that the monitoring session has not ended and that the monitoring session responder has not left the monitoring session, then the monitoring session responder proceeds to step 306 and continues collecting monitoring information about one or more characteristics according to the instructions received from the monitoring session responder. At step 308, in which the monitoring session responder sends the collected information to the monitoring session initiator.

However, if in step 310 the monitoring session responder determined that the monitoring session has ended or that the monitoring session responder has left the monitoring session, then the monitoring session initiator proceeds to step 312. In step 312, monitoring session responder performs session completion operations. For example, the monitoring session responder may turn off passive video monitoring, turn off other types of monitoring, or apply changes to undo the changes performed as part of the monitoring session, release resources allocated at the monitoring session responder for the particular monitoring session, in various embodiments.

The instructions for operations for the monitoring session completion may be indicated by the instructions sent from a monitoring session initiator. Alternatively, the instructions may be hard-coded with the particular type of CMS.

In an embodiment, the session completion operations and actions may be applied autonomously by a state servlet, without requiring further interaction with an external system, a monitoring session initiator, or other elements. For example, the state servlet may determine that the monitoring session CMS has ended and thus completion operations for the monitoring session.

5.0 Implementation Mechanisms

Hardware Overview

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 418. Firmware or software running in the computer system 400 provides a terminal interface or character-based command interface so that external commands can be given to the computer system.

A switching system 416 is coupled to bus 402 and has an input device 414 and a communication interface 418 to one or more external network elements. The external network elements may include a local network 422 coupled to one or more hosts 424, or a global network such as Internet 428 having one or more servers 430. The switching system 416 switches information traffic arriving on input device 414 to communication interface 418 according to pre-determined protocols and conventions that are well known. For example, switching system 416, in cooperation with processor 404, can determine a destination of a packet of data arriving on input device 414 and send it to the correct destination using communication interface 418. The destinations may include host 424, server 430, other end stations, or other routing and switching devices in local network 422 or Internet 428.

According to one embodiment, compliance management is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable storage medium" as used herein refers to any medium that participates in providing instructions to processor 404 for execution. Such a medium may take many forms, including but not limited to, non-transitory and non-volatile storage media and non-transitory volatile storage media. Non-volatile storage media includes, for example, optical or magnetic disks, such as storage device 410. Volatile storage media includes dynamic memory, such as main memory 406.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other non-transitory, tangible storage medium from which a computer can read.

Various forms of computer readable storage media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for compliance management as described herein. The received code may be executed by processor 404 as it is received, and/or stored in storage device 410, or other non-volatile storage for later execution.

7.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method performed by one or more processors comprising an initiator computer and comprising:
   at the initiator computer:
   initiating a first monitoring session for a first communication path including creating and storing first monitoring session state data;
   sending, to a first responder computer of the first communication path, a first request to initiate, on the first responder computer, a first state servlet that is configured to continuously monitor, at the first responder computer, during the first monitoring session, between the initiator computer and the first responder computer, one or more first characteristics of one or more first processes that the first responder computer may perform;
   determining whether a second responder computer has joined the first monitoring session;
   in response to determining that the second responder computer has joined the first monitoring session, sending to the second responder computer a second request to initiate a second state servlet that is configured to monitor continuously, during the first monitoring session, the one or more characteristics of the one or more first processes that the second responder computer may perform;

determining whether the first communication path has been rerouted;

in response to determining that the first communication path has been rerouted to include a third responder computer, adding the third responder computer to the first monitoring session;

at a responder node:

while the first monitoring session is active and the responder node is in the first communications path, the first state servlet monitoring one or more first characteristics of the one or more first processes and sending first monitored information to the monitoring session initiator;

in response to determining that the first monitoring session has become inactive or that the responder node is not in the first communications path, autonomously ending the first monitoring session and deleting first monitoring session state data.

2. The method of claim 1, comprising:

receiving a message from the monitoring session initiator indicating that the first monitoring session has been terminated;

determining that the first monitoring session has been timed-out;

determining that the first monitoring session has been completed;

determining that the first monitoring session has been aborted;

determining that the first monitoring session has been terminated by an administrator;

determining that the responder node has not received an expected communication from the monitoring session initiator;

determining that the responder node has not received an expected request from the monitoring session initiator for data.

3. The method of claim 1, comprising:

receiving a first route initiator notification from the monitoring session initiator indicating that the first communications path has changed, and based at least in part on the first route initiator notification, determining that the first communications path does not include the responder node;

receiving a first route change notification from a first node indicating that the first communications path has changed, and based at least in part on the first route change notification, determining that the first communications path does not include the responder node;

determining that the first communications path has failed;

determining that a first request to reinitiate the first communications path has been issued;

receiving a first refresh command from the monitoring session initiator, and based at least in part on the first refresh command, determining that the first communications path does not include the responder node.

4. The method of claim 1, comprising:

without receiving further instructions from the monitoring session initiator, performing one or more of:

terminating monitoring and sending the first monitored information to the monitoring session initiator;

terminating a passive video monitoring that was associated with the first monitoring session; or releasing resources that were associated with the first monitoring session, including deleting the first monitoring session state data.

5. The method of claim 1, comprising:

receiving from the monitoring session initiator a second refresh command and the second state servlet that is configured to continuously monitor one or more second characteristics of one or more second processes during a second monitoring session of a second communications path between the monitoring session initiator and the responder node;

while the first monitoring session is active and the responder node is in the first communications path, the first state servlet monitoring the one or more first characteristics of the one or more first processes and sending the first monitored information to the monitoring session initiator;

while the second monitoring session is active and the responder node is in the second communications path, the second state servlet monitoring the one or more second characteristics of the one or more second processes and sending second monitored information to the monitoring session initiator;

in response to determining that the second monitoring session has become inactive or that the responder node is not in the second communications path, autonomously ending the second monitoring session and deleting second monitoring session state data.

6. The method of claim 5, comprising:

receiving a second route initiator notification from the monitoring session initiator indicating that the second communications path has changed, and based at least in part on the second route initiator notification, determining that the second communications path does not include the responder node.

7. The method of claim 5, comprising:

receiving a second route change notification from a second node indicating that the second communications path has changed, and based at least in part on the second route change notification, determining that the second communications path does not include the responder node;

determining that the second communications path has failed;

determining that a second request to reinitiate the second communications path has been issued;

receiving a second refresh command from the monitoring session initiator, and based at least in part on the refresh command, determining that the second communications path does not include the responder node.

8. The method of claim 5, comprising:

without receiving further instructions from the monitoring session initiator, performing one or more of:

terminating monitoring and sending the second monitored information to the monitoring session initiator; or terminating a second passive video monitoring that was associated with the second monitoring session.

9. The method of claim 8, comprising:

releasing resources that were associated with the second monitoring session, including deleting the second monitoring session state data.

10. A non-transitory computer-readable non-transitory storage medium storing one or more sequences of instructions which, when executed by one or more processors comprising a responder node, cause the one or more processors to perform:

at an initiator computer:

initiating a first monitoring session for a first communication path including creating and storing first monitoring session state data;

sending, to a first responder computer of the first communication path, a first request to initiate, on the first responder computer, a first state servlet that is configured to continuously monitor, at the first responder computer, during the first monitoring session, between the initiator computer and the first responder computer, one or more characteristics of one or more first processes that the first responder computer may perform;

determining whether a second responder computer has joined the first monitoring session;

in response to determining that the second responder computer has joined the first monitoring session, sending to the second responder computer a second request to initiate a second state servlet that is configured to monitor continuously, during the first monitoring session, the one or more characteristics of the one or more first processes that the second responder computer may perform;

determining whether the first communication path has been rerouted;

in response to determining that the first communication path has been rerouted to include a third responder computer, adding the third responder computer to the first monitoring session at the responder node:
   while the first monitoring session is active and the responder node is in the first communications path, the first state servlet monitoring the one or more first characteristics of the one or more first processes and sending first monitored information to the monitoring session initiator;
   in response to determining that the monitoring session has become inactive or that the responder node is not in the first communications path, autonomously ending the first monitoring session and deleting first monitoring session state data.

11. The non-transitory computer-readable non-transitory storage medium of claim 10, storing additional instructions, which when executed, cause performance of one or more of:
receiving a message from the monitoring session initiator indicating that the first monitoring session has been terminated;
determining that the first monitoring session has been timed-out;
determining that the first monitoring session has been completed;
determining that the first monitoring session has been aborted;
determining that the first monitoring session has been terminated by an administrator;
determining that the responder node has not received an expected communication from the monitoring session initiator; or
determining that the responder node has not received an expected request from the monitoring session initiator for data.

12. The non-transitory computer-readable non-transitory storage medium of claim 10, storing additional instructions, which when executed, cause performance of one or more of:
receiving a first route initiator notification from the monitoring session initiator indicating that the first communications path has changed, and based at least in part on the first route initiator notification, determining that the first communications path does not include the responder node;
receiving a first route change notification from a first node indicating that the first communications path has changed, and based at least in part on the first route change notification, determining that the first communications path does not include the responder node;
determining that the first communications path has failed;
determining that a request to reinitiate the first communications path has been issued; or
receiving a first refresh command from the monitoring session initiator, and based at least in part on the first refresh command, determining that the first communications path does not include the responder node.

13. The non-transitory computer-readable non-transitory storage medium of claim 10, storing additional instructions, which when executed, cause the one or more processors to perform:
without receiving further instructions from the monitoring session initiator, performing one or more of:
   terminating monitoring and sending the first monitored information to the monitoring session initiator;
   terminating a first passive video monitoring that was associated with the first monitoring session; or
   releasing resources that were associated with the first monitoring session, including deleting the first monitoring session state data.

14. The non-transitory computer-readable non-transitory storage medium of claim 10, storing additional instructions, which when executed, cause the one or more processors to perform:
receiving from the monitoring session initiator a second refresh command and the second state servlet that is configured to continuously monitor one or more second characteristics of one or more second processes during a second monitoring session of a second communications path between the monitoring session initiator and the responder node;
while the first monitoring session is active and the responder node is in the first communications path, the first state servlet monitoring the one or more first characteristics of the one or more first processes and sending the first monitored information to the monitoring session initiator;
while the second monitoring session is active and the responder node is in the second communications path, the second state servlet monitoring the one or more second characteristics of the one or more second processes and sending second monitored information to the monitoring session initiator;
in response to determining that the second monitoring session has become inactive or that the responder node is not in the second communications path, autonomously ending the second monitoring session and deleting second monitoring session state data.

15. The non-transitory computer-readable non-transitory storage medium of claim 14, storing additional instructions, which when executed, cause the one or more processors to perform:
receiving a second route initiator notification from the monitoring session initiator indicating that the second communications path has changed, and based at least in part on the second route initiator notification, determining that the second communications path does not include the responder node.

16. The non-transitory computer-readable non-transitory storage medium of claim 14, storing additional instructions, which when executed, cause the one or more processors to perform:

receiving a second route change notification from a second node indicating that the second communications path has changed, and based at least in part on the second route change notification, determining that the second communications path does not include the responder node;

determining that the second communications path has failed;

determining that a second request to reinitiate the second communications path has been issued;

receiving a second refresh command from the monitoring session initiator, and based at least in part on the refresh command, determining that the second communications path does not include the responder node.

17. The non-transitory computer-readable non-transitory storage medium of claim 14, storing additional instructions, which when executed, cause the one or more processors to perform:

without receiving further instructions from the monitoring session initiator, performing one or more of:
terminating monitoring and sending the second monitored information to the monitoring session initiator; or
terminating a second passive video monitoring that was associated with the second monitoring session.

18. The non-transitory computer-readable non-transitory storage medium of claim 17, storing additional instructions, which when executed, cause the one or more processors to perform:

releasing resources that were associated with the second monitoring session, including deleting the second monitoring session state data.

* * * * *